(12) United States Patent
Chen et al.

(10) Patent No.: US 8,359,404 B2
(45) Date of Patent: Jan. 22, 2013

(54) ZONE ROUTING IN A TORUS NETWORK

(75) Inventors: Dong Chen, Yorktown Heights, NY (US); Philip Heidelberger, Yorktown Heights, NY (US); Sameer Kumar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 12/684,184

(22) Filed: Jan. 8, 2010

(65) Prior Publication Data

US 2011/0173343 A1 Jul. 14, 2011

(51) Int. Cl.
  *G06F 15/173* (2006.01)
(52) U.S. Cl. .................... 709/239; 709/238; 709/224
(58) Field of Classification Search .......... 709/238–239, 709/223–224
  See application file for complete search history.

(56) References Cited

U.S. PATENT DOCUMENTS

| | | | |
|---|---|---|---|
| 6,408,002 B1 * | 6/2002 | Quattromani et al. | 370/394 |
| 7,080,156 B2 * | 7/2006 | Lee et al. | 709/238 |
| 7,305,487 B2 | 12/2007 | Blumrich et al. | |
| 7,512,340 B2 * | 3/2009 | Sone et al. | 398/59 |
| 7,633,940 B1 * | 12/2009 | Singh et al. | 370/389 |
| 7,958,184 B2 * | 6/2011 | Barsness et al. | 709/201 |
| 2004/0078482 A1 * | 4/2004 | Blumrich et al. | 709/238 |
| 2004/0103218 A1 * | 5/2004 | Blumrich et al. | 709/249 |
| 2006/0064518 A1 * | 3/2006 | Bohrer et al. | 710/22 |
| 2008/0186853 A1 * | 8/2008 | Archer et al. | 370/235 |
| 2008/0263386 A1 * | 10/2008 | Darrington et al. | 714/4 |
| 2008/0320228 A1 | 12/2008 | Brunheroto et al. | |

OTHER PUBLICATIONS

Kumar, S. et al., "Optimization of All-to-All Communication on the Blue Gene/L Supercomputer" Parallel Processing, 2008, ICPP apos;08. 37th International Conference, 2008, pp. 320-329.
Adiga, N.R., et al., "Blue Gene/L torus interconnection network" IBM Journal of Research and Development, 2005, pp. 265-276, vol. 49, Issue 2.
IBM's Device Control Register Bus 3.5 Architecture Specifications Jan. 27, 2006.

* cited by examiner

*Primary Examiner* — Philip B Tran
(74) *Attorney, Agent, or Firm* — Scully, Scott, Murphy & Presser, P.C.; Daniel P. Morris, Esq.

(57) ABSTRACT

A system for routing data in a network comprising a network logic device at a sending node for determining a path between the sending node and a receiving node, wherein the network logic device sets one or more selection bits and one or more hint bits within the data packet, a control register for storing one or more masks, wherein the network logic device uses the one or more selection bits to select a mask from the control register and the network logic device applies the selected mask to the hint bits to restrict routing of the data packet to one or more routing directions for the data packet within the network and selects one of the restricted routing directions from the one or more routing directions and sends the data packet along a link in the selected routing direction toward the receiving node.

18 Claims, 7 Drawing Sheets

| Byte Number | Function | Comment |
| --- | --- | --- |
| 0 | Data Packet Type: 0 x 55 | Set by software |
| 1 | Hint bits for dimensions A-D | A-, A+, B-, B+, C-, C+, D-, D+ |
| 2 | Bit 0-1, hint bits for E dimension<br>Bit 2, Route I/O node<br>Bit 3-4, return from I/O node, "01" use torus port 6, "10" use torus port 7, "11" use I/O port<br>Bit 5, dynamic<br>Bit 6, deposit<br>Bit 7, Interrupt | The interrupt bit is set by the message unit, depending on a bit in the descriptor. It is only set for the last packet of a message (else 0) |
| 3 | Bit 0-2 virtual channel (0 dynamic,1 deterministic (escape), 2 high priority, 3 system, 4 user commworld, 5 user subcommunicator, 6 system collective<br>Bit 3-4, zone routing id<br>Bit 5, stay on bubble<br>Bit 6-7 Reserve | Note class routes must be defined so that user commworld and system collective do not share links they actually share one physical VC |
| 4-7 | Bit 0-1 Reserve<br>Bit 2-7, A destination address<br>Bit 8-13, B destination address<br>Bit 14-19, C destination address<br>Bit 20-25, D destination address<br>Bit 26-31, E destination address | |
| 8 | Bit 0-1, message unit packet type("00" FIFO, "01" put, "10" get, "11" paced-get)<br>Bit 2, Reserved<br>Bit 3-7, Size | Size 0 to 16: number of 32 byte data payload chunks added to header |
| 9 | Bit 0-2, Reserved<br>Bit 3-7, Duplicated size | On Injection:<br>Bits 0-4: alignment (se by MU)<br>Bits 5-13: valid bytes in payload (0 means 512, Set by MU)<br>Bits 16-23: number of 4 byte words to skip for injection checksum (set by software) |
| 10 | Link sequence number | |
| 11 | Header 8 bit CRC | |
| 12-31 | Header Unit header | |
| 32-543 | Payload Bytes | 0 to 16 payload chunks 32 bytes each |

FIG. 4

ZONE ROUTING IN A TORUS NETWORK

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending U.S. Patent Applications filed on even date herewith, the entire contents and disclosure of each of which is expressly incorporated by reference herein as if fully set forth herein. U.S. patent application Ser. No. 13/446,467, for "USING DMA FOR COPYING PERFORMANCE COUNTER DATA TO MEMORY"; U.S. patent application Ser. No. 12/684,172, for "HARDWARE SUPPORT FOR COLLECTING PERFORMANCE COUNTERS DIRECTLY TO MEMORY"; U.S. patent application Ser. No. 12/684,190, for "HARDWARE ENABLED PERFORMANCE COUNTERS WITH SUPPORT FOR OPERATING SYSTEM CONTEXT SWITCHING"; U.S. patent application Ser. No. 12/864,496, for "HARDWARE SUPPORT FOR SOFTWARE CONTROLLED FAST RECONFIGURATION OF PERFORMANCE COUNTERS"; U.S. patent application Ser. No. 12/684,429, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. patent application Ser. No. 12/684,738, for "DISTRIBUTED PERFORMANCE COUNTERS"; U.S. patent application Ser. No. 12/696,780, for "LOCAL ROLLBACK FOR FAULT-TOLERANCE IN PARALLEL COMPUTING SYSTEMS"; U.S. patent application Ser. No. 12/684,860, for "PAUSE PROCESSOR HARDWARE THREAD UNTIL PIN"; U.S. patent application Ser. No. 12/684,174, for "PRECAST THERMAL INTERFACE ADHESIVE FOR EASY AND REPEATED, SEPARATION AND REMATING"; U.S. patent application Ser. No. 12/684,852, for "PROCESSOR RESUME UNIT"; U.S. patent application Ser. No. 12/684,642, for "TLB EXCLUSION RANGE"; U.S. patent application Ser. No. 12/684,804, for "DISTRIBUTED TRACE USING CENTRAL PERFORMANCE COUNTER MEMORY"; U.S. patent application Ser. No. 13/008,602, for "PARTIAL CACHE LINE SPECULATION SUPPORT"; U.S. patent application Ser. No. 12/986,349, for "ORDERING OF GUARDED AND UNGUARDED STORES FOR NO-SYNC I/O"; U.S. patent application Ser. No. 12/693,972, for "DISTRIBUTED PARALLEL MESSAGING FOR MULTIPROCESSOR SYSTEMS"; U.S. patent application Ser. No. 12/688,747, for "SUPPORT FOR NON-LOCKING PARALLEL RECEPTION OF PACKETS BELONGING TO THE SAME RECEPTION FIFO"; U.S. Pat. No. 8,086,766; U.S. patent application Ser. No. 12/688,773, for "OPCODE COUNTING FOR PERFORMANCE MEASUREMENT"; U.S. patent application Ser. No. 12/684,776, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, for "A MULTI-PETASCALE HIGHLY EFFICIENT PARALLEL SUPERCOMPUTER"; U.S. patent application Ser. No. 12/984,252, for "CACHE WITHIN A CACHE"; U.S. patent application Ser. No. 13/008,502, for "MULTIPROCESSOR SYSTEM WITH MULTIPLE CONCURRENT MODES OF EXECUTION"; U.S. patent application Ser. No. 13/008,583, for "READER SET ENCODING FOR DIRECTORY OF SHARED CACHE MEMORY IN MULTIPROCESSOR SYSTEM"; U.S. patent application Ser. No. 12/984,308, for "EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION"; U.S. patent application Ser. No. 12/984,329, for "PHYSICAL ALIASING FOR THREAD LEVEL SPECULATION WITH A SPECULATION BLIND CACHE"; U.S. patent application Ser. No. 12/696,825, for "LIST BASED PREFETCH", now U.S. Pat. No. 8,255,633; U.S. patent application Ser. No. 12/684,693, for "PROGRAMMABLE STREAM PREFETCH WITH RESOURCE OPTIMIZATION"; U.S. patent application Ser. No. 61/293,494, for "FLASH MEMORY FOR CHECKPOINT STORAGE"; U.S. patent application Ser. No. 61/293,476, for "NETWORK SUPPORT FOR SYSTEM INITIATED CHECKPOINTS"; U.S. patent application Ser. No. 61/293,554, for "TWO DIFFERENT PREFETCH COMPLEMENTARY ENGINES OPERATING SIMULTANEOUSLY"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, for "RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No, 61/293,569, for "SYSTEM AND METHOD FOR IMPROVING THE EFFICIENCY OF STATIC CORE TURN OFF IN SYSTEM OF CHIP (SoC) WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "ATOMICITY: A MULTI-PRONGED APPROACH"; U.S. patent application Ser. No, 12/697,175 for "I/O ROUTING IN A MULTIDIMENSIONAL TORUS NETWORK"; U.S. patent application Ser. No. 12/684,287 for "ARBITRATION IN CROSSBAR INTERCONNECT FOR LOW LATENCY"; U.S. patent application Ser. No. 12/684,630, for "EAGER PROTOCOL ON A CACHE PIPELINE DATAFLOW"; U.S. patent application Ser. No. 12/723,277, for "EMBEDDED GLOBAL BARRIER AND COLLECTIVE IN A TORUS NETWORK"; U.S. patent application Ser. No. 61/293,499, for "GLOBAL SYNCHRONIZATION OF PARALLEL PROCESSORS USING CLOCK PULSE WIDTH MODULATION"; U,S, patent application Ser. No. 61/293,266 for "IMPLEMENTATION OF MSYNC"; U.S. patent application Ser. No. 12/796,389, for "BALANCING WORKLOAD IN A MULTIPROCESSOR SYSTEM RESPONSIVE TO PROGRAMMABLE ADJUSTMENTS IN A SYNCHRONIZATION INSTRUCTION"; U.S. patent application Serial No. 12/696,817, for "HEAP/STACK GUARD PAGES USING A WAKEUP UNIT"; U.S. patent application Ser. No. 61/293,603, for "MECHANISM OF SUPPORTING SUB-COMMUNICATOR COLLECTIVES WITH O(64) COUNTERS AS OPPOSED TO ONE COUNTER FOR EACH SUB-COMMUNICATOR"; and U.S. patent application Ser. No. 61/299,918 for "REPRODUCIBILITY IN A MULTIPROCESSOR SYSTEM".

BACKGROUND

The present invention relates to routing data through a parallel computing system, and more particularly to selecting an efficient path for routing data through the parallel computer system.

A large parallel computer system, such as IBM's BLUEGENE™ parallel computer system, has many nodes interconnected with each other. In the IBM BLUEGENE™ parallel computer system, each node is interconnected along multiple dimensions in a torus topology. For example, the IBM BLUEGENE™/L or P parallel computer system can be configured as a three-dimensional network topology.

The nodes communicate with each other by injecting data packets into the torus network. The data packets at the sending node are stored in an Injection FIFO buffer and injected into the torus network by a processor or a DMA logic. The receiving node stores the injected data packets in a reception FIFO buffer or directly into an arbitrary location in memory. In a three-dimensional torus, there are 6 possible links for receiving a data packet and 6 possible links for sending a data packet between nodes. These links may be labeled as '+x', '−x', '+y', '−y', '+z', and '−z'.

Prior art BLUEGENE™ parallel computer systems use dynamic routing to communicate data between nodes. Each data packet contains a 'dynamic' bit, which if set indicates that the packet may be dynamically routed. Dymanic routing can improve throughput by avoiding busy links between nodes. Each data packet contains a destination address coordinates for the receiving node and 'hint bits' that indicate which links may be used to move the data packet towards its destination.

In a data packet header for a three-dimensional torus there are 6 hint bits corresponding to connections between the sending node and the receiving node in the '+x', '−x', '+y', '−y', '+z', and '−z' directions. These hint bits indicate allowable directions the data packet may move towards its destination and are used to permit early arbitration of the packet.

An important communication pattern in parallel computer systems is 'All-to-All' in which each node sends data packets to each connected node. Generally, communication of data packets over a symmetrical torus, i.e., the number of nodes is the same within each dimension, is more efficient that communication over an asymmetrical torus. In an asymmetrical torus performance may degrade due to head-of-line blocking effects.

Thus, there is a need in the art for a method and system that improves communication of data within a parallel computer system. Specifically, needed is a method and system that improves the efficiency of communicating data within an asymmetrical torus.

SUMMARY

In one embodiment, a system for routing data in a network comprising a network logic device at a sending node for determining a path between the sending node and a receiving node, wherein the network logic device sets one or more selection bits and one or more hint bits within the data packet, a control register for storing one or more masks, wherein the network logic device uses the one or more selection bits to select a mask from the control register and the network logic device applies the selected mask to the hint bits to restrict routing of the data packet to one or more routing directions for the data packet within the network and selects one of the restricted routing directions from the one or more allowable routing directions and sends the data packet along a link in the selected routing direction toward the receiving node.

In another embodiment, a computer implemented method for routing a data packet in a network comprising determining a path between a sending node and a receiving node, setting hint bits and one or more selection bits within the data packet, using the one or more selection bits to select a mask, and applying the mask to the hint bits to determine a routing direction on the path for the data packet within the network and initiating routing of said packet along a link in the routing direction.

A computer readable medium for setting hint bits within a data packet is also disclosed.

BRIEF DESCRIPTION OF DRAWINGS

FIG. 4 is an example of a data packet;

DETAILED DESCRIPTION

This invention applies to network communication in a massively parallel computing system, such as the IBM BLUEGENE™/Q parallel computing system. The disclosure of U.S. Pat. No. 7,305,487 titled 'Optimized Scalable Network Switch' is hereby incorporated by reference in its entirety. As described herein, the use of the letter 'B' represents a Byte quantity, e.g., 2 B, 8.0 B, 32 B, and 64 B represent Byte units; 'GB' represent Gigabyte quantities.

Figure 1:
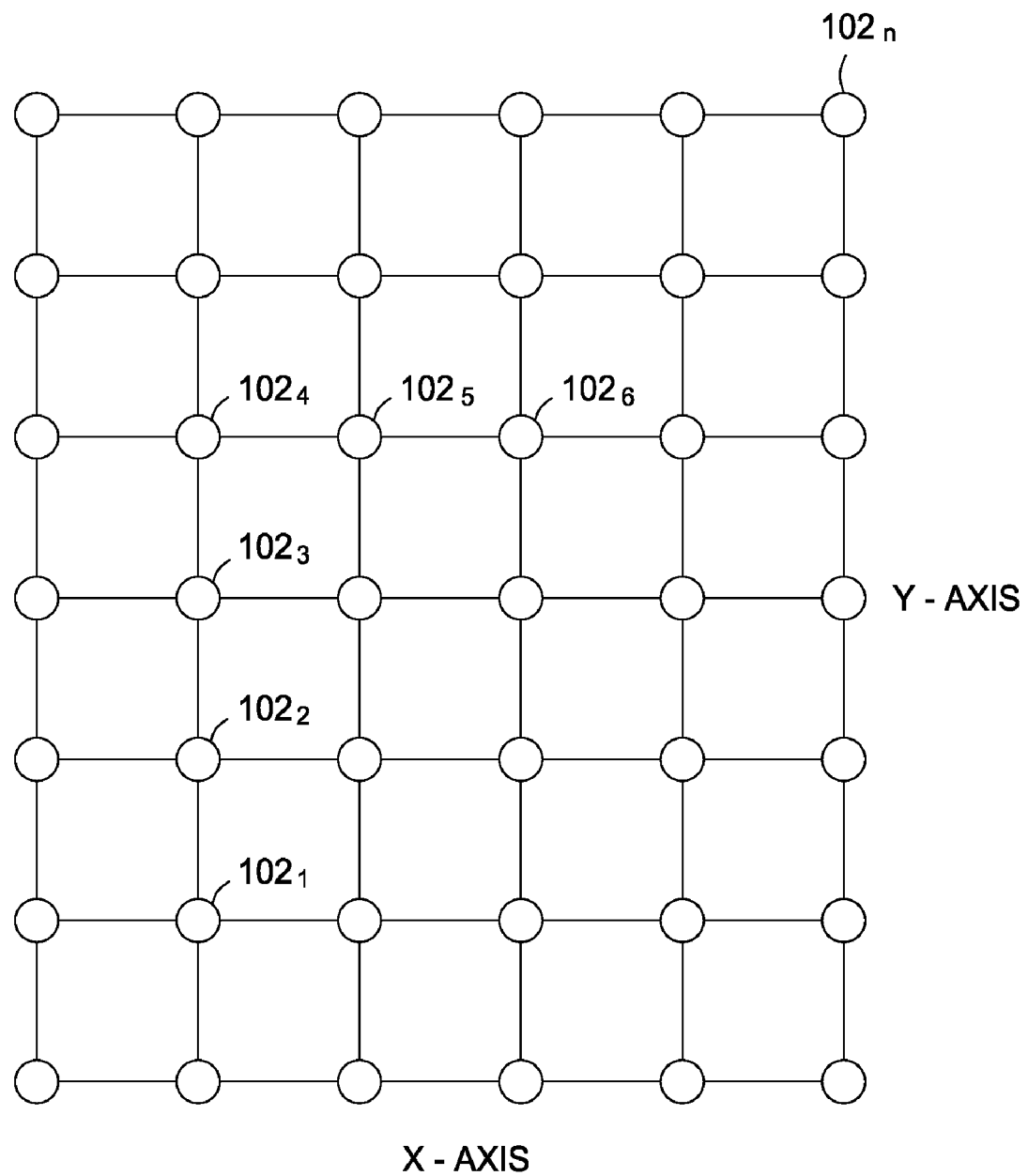
FIG. 1 is an example of an asymmetrical torus.

FIG. 1 is an example of an asymmetrical torus. The shown example is a two-dimensional torus that is longer along one axis, e.g., the y-axis (+/−y-dimension) and shorter along another axis, e.g., the x-axis (+/−x-dimension). The size of the torus is defined as (Nx, Ny), where Nx is the number of nodes along the x-axis and Ny is the number of nodes along the y-axis; the total number of nodes in the torus is calculated as Nx*Ny. In the given example, there are six nodes along the x-axis and seven nodes along the y-axis, for a total of 42 nodes in the entire torus. The torus is asymmetrical because the number of nodes along the y-axis is greater than the number of nodes along the x-axis. It is understood that an asymmetrical torus is also possible within a three-dimensional torus having x, y, and z-dimensions, as well as within a five-dimensional torus having a, b, c, d, and e-dimensions.

The asymmetrical torus comprises nodes $102_1$ to $102_n$. These nodes are also known as 'compute nodes'. Each node 102 occupies a particular point within the torus and is interconnected, directly or indirectly, by a physical wire to every other node within the torus. For example, node $102_1$ is directly connected to node $102_2$ and indirectly connected to node $102_3$. Multiple connecting paths between nodes 102 are often possible. A feature of the present invention is a system and method for selecting the 'best' or most efficient path between nodes 102. In one embodiment, the best path is the path that reduces communication bottlenecks along the links between nodes 102. A communication bottleneck occurs when a reception FIFO at a receiving node is full and unable to receive a data packet from a sending node. In another embodiment, the best path is the quickest path between nodes 102 in terms of computational time. Often, the quickest path is also the same path that reduces communication bottlenecks along the links between nodes 102.

As an example, assume node $102_1$ is a sending node and node $102_6$ is a receiving node. Nodes $102_1$ and $102_6$ are indirectly connected. There exists between these nodes a 'best' path for communicating data packets. In an asymmetrical torus, experiments conducted on the IBM BLUEGENE™ parallel computer system have revealed that the 'best' path is generally found by routing the data packets along the longest dimension first, then continually routing the data across the next longest path, until the data is finally routed across the shortest path to the destination node. In this example, the longest path between node $102_1$ and node $102_6$ is along the y-axis and the shortest path is along the x-axis. Therefore, in this example the 'best' path is found by communicating data along the y-axis from node $102_1$ to node $102_2$ to node $102_3$ to node $102_4$ and then along the x-axis from node $102_4$ node $102_5$ and finally to receiving node $102_6$. Traversing the torus in this manner, i.e., by moving along the longest available path first, has been shown in experiments to increase the efficiency of communication between nodes in an asymmetrical torus by as much as 40%. These experiments are further discussed in "Optimization of All-to-all Communication on the Blue Gene/L Supercomputer" $37^{th}$ International Conference on Parallel Processing, IEEE 2008, the contents of which are incorporated by reference in their entirety. In those experiments, packets were first injected into the network and sent to an intermediate node along the longest dimension, where it was received into the memory of the intermediate node. It was then re-injected into the network to the final destination. This requires additional software overhead and requires additional memory bandwidth on the intermediate nodes. The present invention is much more general than this, and requires no receiving and re-injecting of packets at intermediate nodes.

Figure 2:
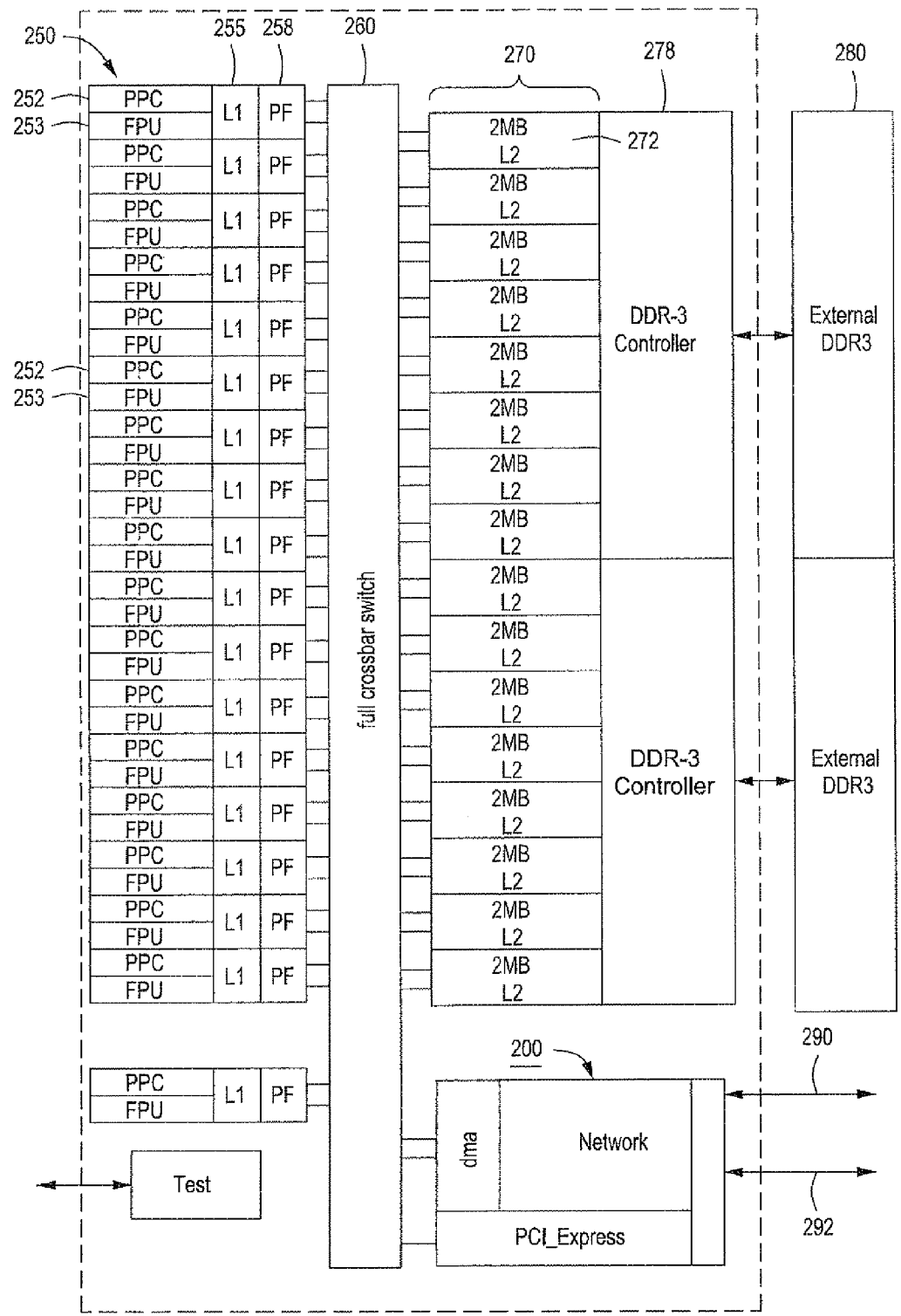
FIG. 2 is an overall architecture of a multiprocessor computing node.

Referring now to FIG. 2, there is shown the overall architecture of the multiprocessor computing node 50 implemented in a parallel computing system in which the present invention is implemented. In one embodiment, the multiprocessor system implements a BLUEGENE™ torus interconnection network, which is further described in the journal article "Blue Gene/L torus interconnection network" N. R. Adiga, et. al., IBM J. Res, & Dev. Vol. 49, 2005, the contents of which are incorporated by reference in its entirety. Although the BLUEGENE™/L torus architecture comprises a three-dimensional torus, it is understood that the present invention also functions in a five-dimensional torus, such as implemented in the BLUEGENE™/Q massively parallel computing system comprising compute node ASICs (BQC), each compute node including multiple processor cores.

A compute node of this present massively parallel supercomputer architecture and in which the present invention may be employed is illustrated in FIG. 2. The compute node 250 is a single chip ('nodechip') based on low power A2 PowerPC cores, though the architecture can use any low power cores, and may comprise one or more semiconductor chips. In the embodiment depicted, the node includes 16 PowerPC A2 cores running at 1600 MHz.

More particularly, the basic nodechip 250 of the massively parallel supercomputer architecture illustrated in FIG. 2 includes in one embodiment seventeen (16+1) symmetric multiprocessing (SMP) cores 252, each core being 4-way hardware threaded and supporting transactional memory and thread level speculation, including a Quad Floating Point Unit (FPU) 253 on each core (204.8 GF peak node). In one implementation, the core operating frequency target is 1.6 GHz providing, for example, a 563 GB/s bisection bandwidth to shared L2 cache 70 via a full crossbar switch 60. In one embodiment, there is provided 32 MB of shared L2 cache 70, each core having an associated 2 MB of L2 cache 72. There is further provided external DDR SDRAM (i.e., Double Data Rate synchronous dynamic random access) memory 280, as a lower level in the memory hierarchy in communication with the L2. In one embodiment, the node includes 42.6 GB/s DDR3 bandwidth (1.333 GHz DDR3) (2 channels each with chip kill protection).

Each FPU 253 associated with a core 252 has a 32 B wide data path to the L1-cache 255, allowing it to load or store 32 B per cycle from or into the L1-cache 255. Each core 252 is directly connected to a prefetch unit (level-1 prefetch, L1P) 258, which accepts, decodes and dispatches all requests sent out by the core 252. The store interface from the core 252 to the UP 255 is 32 B wide and the load interface is 16 B wide, both operating at the processor frequency. The L1P 255 implements a fully associative, 32 entry prefetch buffer. Each entry can hold an L2 line of 328 B size. The L1P provides two prefetching schemes for the prefetch unit 258: a sequential prefetcher as used in previous BLUEGENE™ architecture generations, as well as a list prefetcher. The prefetch unit is further disclosed in U.S. Patent Publication No. 2008-0320228, which is incorporated by reference in its entirety.

As shown in FIG. 2, the 32 MB shared L2 (FIG. 4) is sliced into 16 units, each connecting to a slave port of the switch 60. Every physical address is mapped to one slice using a selection of programmable address bits or a XOR-based hash across all address bits. The L2-cache slices, the L1Ps and the L1-D caches of the A2s are hardware-coherent. A group of 4 slices is connected via a ring to one of the two DDR3 SDRAM controllers 278.

By implementing a direct memory access engine referred to herein as a Messaging Unit, 'MU' such as MU 200, with each MU including a DMA engine and a Network Device 250 in communication with the crossbar switch 260, chip I/O functionality is provided. In one embodiment, the compute node further includes, in a non-limiting example: 10 intra-rack interprocessor links 290, each operating at 2.0 GB/s, i.e., 10*2 GB/s intra-rack & inter-rack (e.g., configurable as a 5-D torus in one embodiment); and, one I/O link 292 interfaced with the MU 200 at 2.0 GB/s (2 GB/s I/O link (to I/O subsystem)) is additionally provided. The system node 250 employs or is associated and interfaced with an 8-16 GB memory/node (not shown).

Although not shown, each A2 processor core 252 has associated a quad-wide fused multiply-add SIMD floating point unit, producing 8 double precision operations per cycle, for a total of 328 floating point operations per cycle per compute node. A2 is a 4-way multi-threaded 64b PowerPC implementation. Each A2 processor core 252 has its own execution unit (XU), instruction unit (IU), and quad floating point unit (QPU) connected via the AXU (Auxiliary eXecution Unit) (FIG. 2). The QPU (Reference 3) is an implementation of the 4-way SIMD QPX floating point instruction set architecture. QPX is an extension of the scalar PowerPC floating point architecture. It defines 32 32 B-wide floating point registers per thread instead of the traditional 32 scalar 8 B-wide floating point registers.

Figure 3:
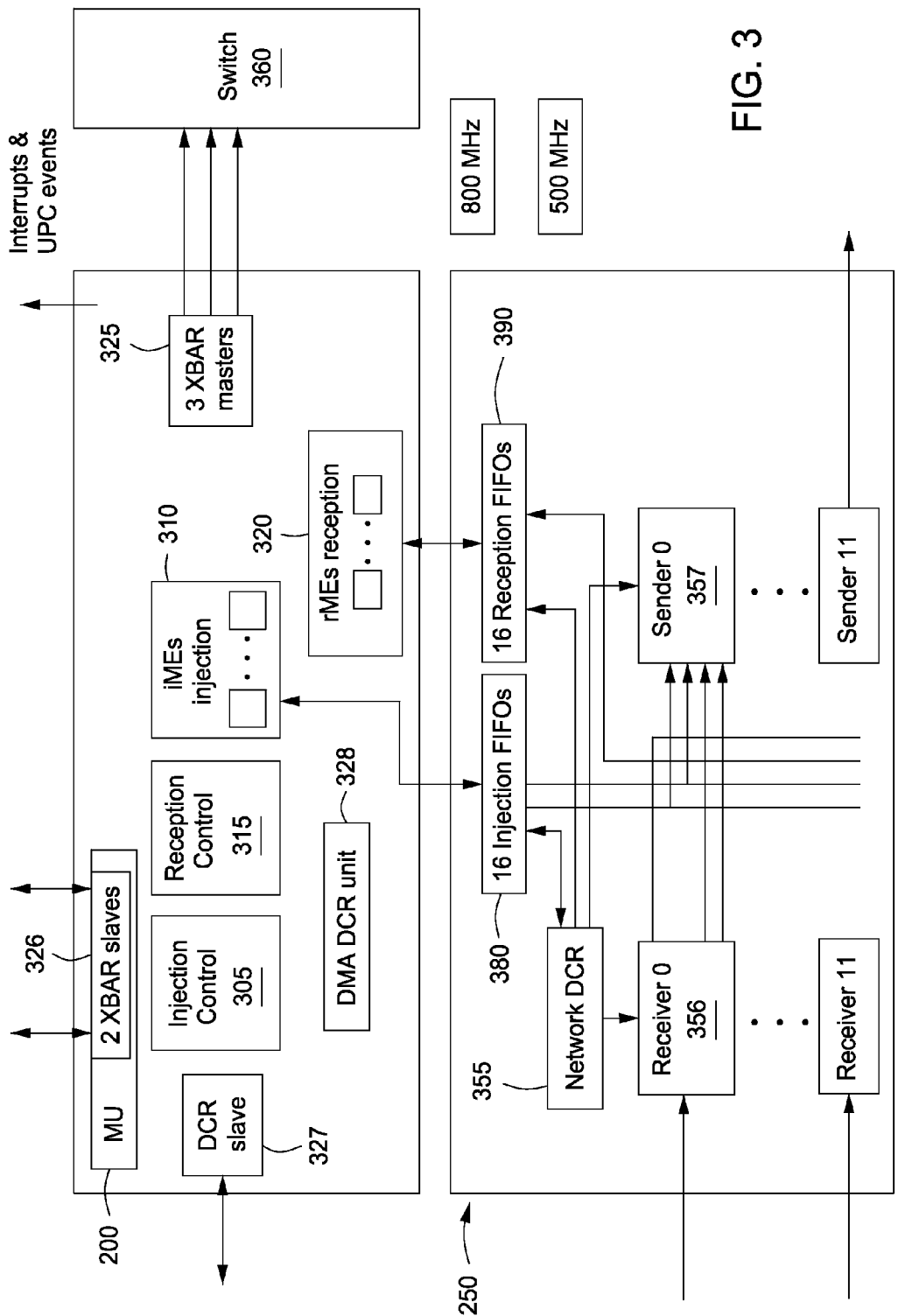
FIG. 3 is an overall architecture of a multiprocessor computing node

As shown in FIG. 3, the compute node implements a direct memory access engine referred to herein as a Messaging Unit 'MU', such as MU 200 to offload the network interface. The MU 200 transfers blocks via three switch master ports between the L2-caches 70 (FIG. 2) and the reception FIFOs 390 and injection FIFOs 380 of the network interface 250.

The MU is controlled by the cores via memory mapped I/O access through an additional switch slave port.

In one embodiment, one function of the messaging unit 200 is to ensure optimal data movement to, and from the network into the local memory system. It supports injection and reception of messages, as well as data prefetching into the memory, and on-chip memory copy. On the injection side, the MU splits and packages messages into network packets, and sends packets to the network respecting the network protocol. On packet injection, the messaging unit distinguishes between packet injection, and memory prefetching packets. A memory prefetch mode is supported in which the MU fetches a message into L2, but does not send it. On the reception side, it receives network packets, and writes them into the appropriate location in memory, depending on the network protocol. On packet reception, the messaging unit 200 distinguishes between three different types of packets, and accordingly performs different operations. The types of packets supported are: memory FIFO packets, direct put packets, and remote get packets.

The messaging unit 200 also supports local memory copy, where the MU copies an area in the local memory to another area in the memory. For memory-to-memory on chip data transfer, a dedicated SRAM buffer, located in the network device, is used. Remote get operations and their corresponding direct put operations can be 'paced' by software to reduce contention within the network. In this software-controlled paced mode, a remote get for a long message is broken up into multiple remote get operations, each remote get operation for retrieving a sub-message. The sub-message remote get operation is only allowed to enter the network if the number of packets belonging to the paced remote get active in the network is less than an allowed threshold. Software has to carefully control the pacing, otherwise deadlocks can occur.

The top level architecture of the Messaging Unit 200 interfacing with the Network interface Device (ND) 250 is shown in FIG. 3. The Messaging Unit 200 functional blocks involved with injection control as shown in FIG. 3 includes the following: Injection control units 305 implementing logic for queuing and arbitrating the processors' requests to the control areas of the injection MU; Reception control units 315 implementing logic for queuing and arbitrating the requests to the control areas of the reception MU; Injection iMEs (injection Message Elements) 310 that reads data from L2 cache or DDR memory and inserts it in the network injection FIFOs 380. Reception rMEs (reception Message Elements) 320 that reads data from the network reception FIFOs 390, and inserts them into L2. In one embodiment, there are 16 rMEs 320, one for each network reception FIFO. A DCR (Device Control Register) Unit 328 is provided that includes DCR registers for the MU 200.

Figure 3A:
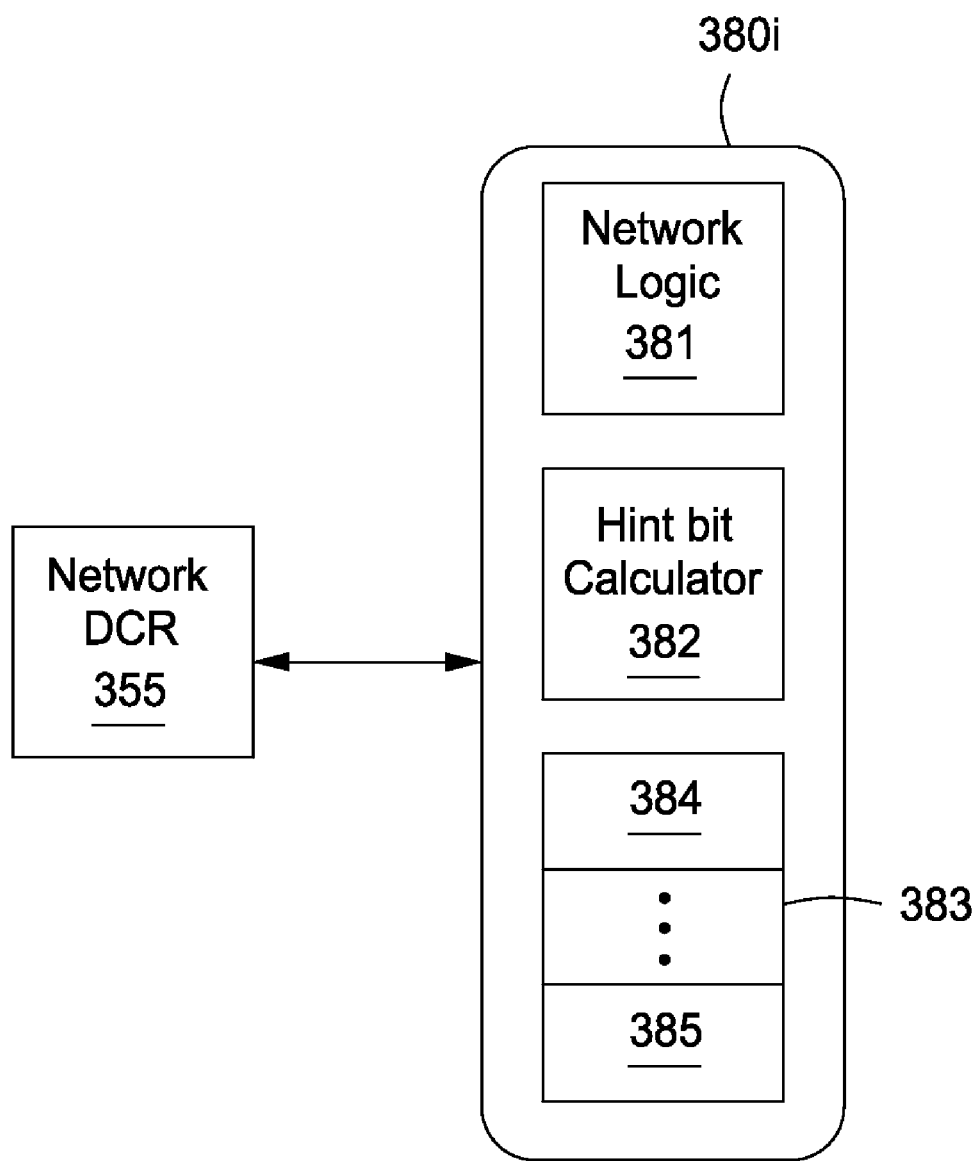

As shown in FIG. 3A, the injection FIFO 380$_i$ (where i=1 to 16 for example) comprises a network logic device 381 for routing data packets, a hint bit calculator 382, and data arrays 383. While only one data array 383 is shown, it is understood that the injection FIFO 380 contains a memory for storing multiple data arrays. The data array 383 further includes data packets 384 and 385. The injection FIFO 380 is coupled to the network DCR 355. The network DCR is also coupled to the reception FIFO 390, the receiver 356, and the sender 357. A complete description of the DCR architecture is available in IBM's Device Control Register Bus 3.5 Architecture Specifications Jan. 27, 2006, which is incorporated by reference in its entirety. The network logic device 381 controls the flow of data into and out of the injection FIFO 381. The network logic device 381 also functions to apply 'mask bits' supplied from the network DCR 355 to hint bits stored in the data packet 384 as described in further detail below. The hint bit calculator functions to calculate the 'hint bits' that are stored in a data packet 384 to be injected into the torus network.

The MU 200 further includes an Interface to a cross-bar switch (XBAR) switch, or in additional implementations SerDes switches. In one embodiment, the MU 200 operates at half the clock of the processor core, i.e., 800 MHz. In one embodiment, the Network Device 250 operates at 500 MHz (e.g., 2 GB/s network). The MU 200 includes three (3) XBAR masters 325 to sustain network traffic and two (2) XBAR slaves 326 for programming. A DCR slave interface unit 327 for connecting the DMA DCR unit 328 to one or more DCR slave registers (not shown) is also provided.

The handover between network device 250 and MU 200 is performed via 2-port SRAMs for network injection/reception FIFOs. The MU 200 reads/writes one port using, for example, an 800 MHz clock, and the network reads/writes the second port with a 500 MHz clock. The only handovers are through the FIFOs and FIFOs' pointers (which are implemented using latches).

FIG. 4 is an example of a data packet 384. There are 2 hint bits per dimension that specify the direction of a of a packet route in that dimension in the data packet header. A data packet routed over a 2-dimensional torus utilizes 4 hint bits. One hint bit represents the '+x' dimension and another hint bit represents the x' dimension; one hint bit represents the '+y' dimension and another hint bit represents the y' dimension. A data packet routed over a 3-dimensional torus utilizes 6 hint bits. One hint bit each represents the +/−x, +/−y and +/−z dimensions. A data packet routed over a 5-dimensional torus utilizes 10 hint bits. One hint bit each represents the +/−a, +/−b, +/−c, +/−d and +/−e dimensions.

The size of the data packet 384 may range from 32 to 544 bytes, in increments of 32 bytes. The first 32 bytes of the data packet 384 form the packet header. The first 12 bytes of the packet header form a network header (bytes 0 to 11); the next 20 bytes form a message unit header (bytes 12 to 31). The remaining bytes (bytes 32 to 543) in the data packet 384 are the payload 'chunks'. In one embodiment, there are up to 16 payload 'chunks', each chunk containing 32 bytes.

Figure 5:
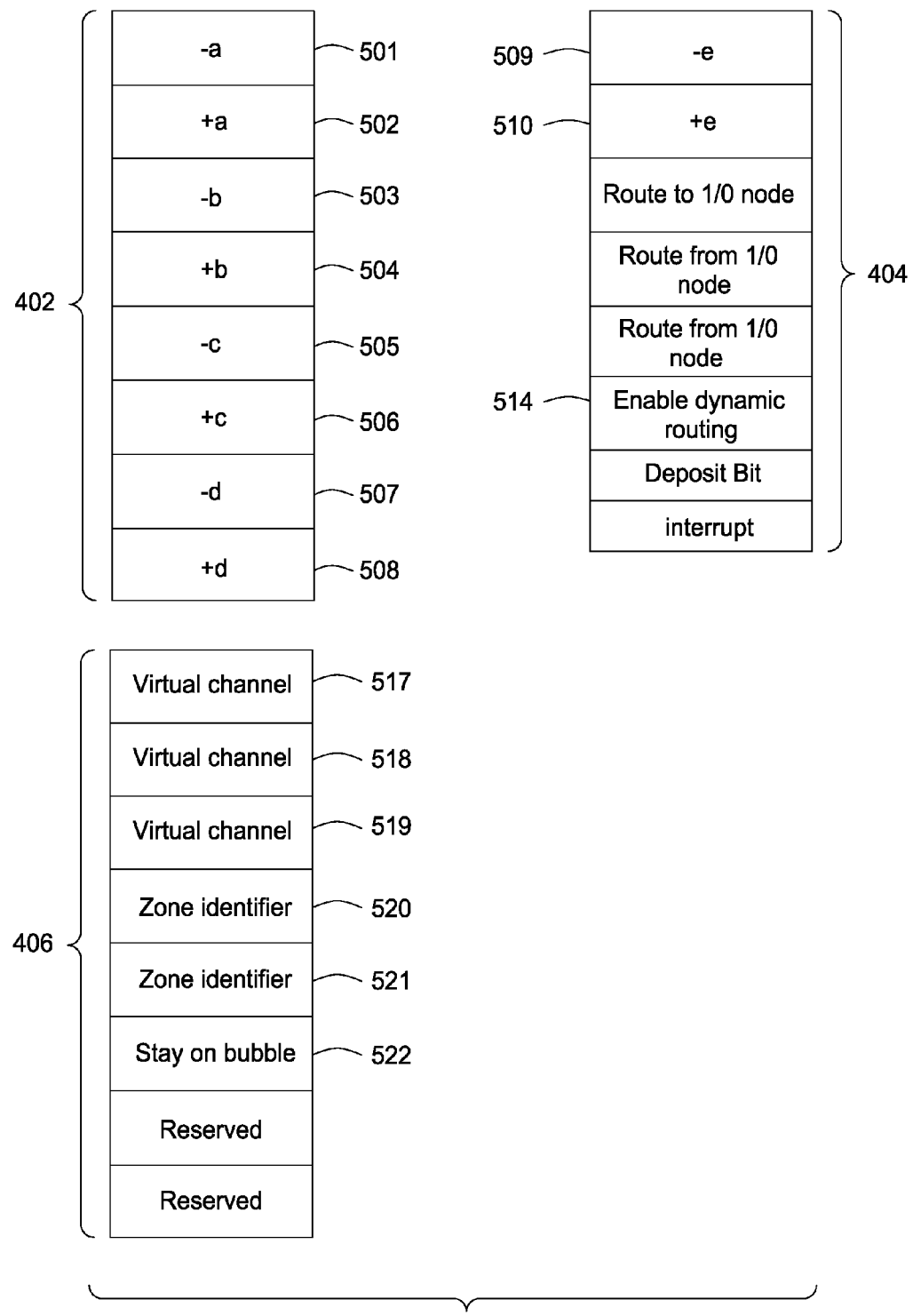
FIG. 5 is an expanded view of bytes within the data packet.

Several bytes within the data packet 384, i.e., byte 402, byte 404 and byte 406 are shown in further detail in FIG. 5. In one embodiment of the invention, bytes 402 and 404 comprise hint bits for the +/−a, +/−b, +/−c, +/−d and +/−e dimensions. In addition, byte 404 comprises additional routing bits. Byte 406 comprises bits for selecting a virtual channel (an escape route), i.e., bits 517, 518, 519 for example, and zone identifier bits. In one embodiment, the zone identifier bits are set by the processor. Zone identifier bits are also known as 'selection bits'. The virtual channels prevent communication deadlocks. To prevent deadlocks, the network logic device 381 may route the data packet on a link in direction of an escape link and an escape virtual channel when movement in the one or more allowable routing directions for the data packet within the network is unavailable. Once a data packet is routed onto the escape virtual channel, if the 'stay on bubble' bit 522 is set to 1 to keep the data packet on the escape virtual channel towards its final destination. If the 'stay on bubble' bit 522 is 0, the packet may change back to the dynamic virtual channel and continue to follow the dynamic routing rules as described in this patent application. Details of the escape virtual channel are further discussed in U.S. Pat. No. 7,305,487.

Referring now to FIG. 5, bytes 402, 404 and 406 are described in greater detail. The data packet 384 includes a virtual channel (VC), a destination address, 'hint' bits and other routing control information. In one embodiment utilizing a five-dimensional torus, the data packet 384 has 10 hint bits stored in bytes 402 and 404, 1 hint bit for each direction (2 bits/dimension) indicating whether the network device is to route the data packet in that direction. Hint bit 501 for the '−a' direction, hint bit 502 for the '+a' direction, hint bit 503 for the '−b' direction, hint bit 504 for the '+b' direction, hint bit 505 for the '+c' direction, hint bit 506 for the '+c' direction, hint bit 507 for the '−d' direction, hint bit 508 for the '+d' direction, hint bit 509 for the '−e' direction and hint bit 510 for the '+e' direction. When the hint bits for a direction are set to 1, in one embodiment the data packet 384 is allowed to be routed in that direction. For example, if hint bit 501 is set to 1, then the data packet is allowed to move in the '−a' direction. It is illegal to set both the plus and minus hint bits for the same dimension. For example, if hint bit 501 is set to 1 for the '—a' dimension, then hint bit 502 for the '+a' dimension must be set to 0.

A point-to-point packet flows along the directions specified by the hint bits at each node until reaching its final destination. As described in U.S. Pat. No. 7,305,487 the hint bits get modified as the packet flows through the network. When a node reaches its destination in a dimension, the network logic device 381 changes the hint bits for that dimension to 0, indicating that the packet has reached its destination in that dimension. When all the hint bits are 0, the packet has reached its final destination. An optimization of this permits the hint bit for a dimension to be set to 0 on the node just before it reaches its destination in that dimension. This is accomplished by having a DCR register containing the node's neighbor coordinate in each direction. As the packet is leaving the node on a link, if the data packet's destination in that direction's dimension equals the neighbor coordinate in that direction, the hint bit for that direction is set to 0.

The Injection FIFO 380 stores data packets that are to be injected into the network interface by the network logic device 381. The network logic device 381 parses the data packet to determine in which direction the data packet should move towards its destination, i.e., in a five-dimensional torus the network logic device 381 determines if the data packet should move along links in the 'a' 'b' 'c' 'd' or 'e' dimensions first by using the hint bits. With dynamic routing, a packet can move in any direction provided the hint bit for direction is set and the usual flow control tokens are available and the link is not otherwise busy. For example, if the '+a' and '+b' hint bits are set, then a packet could move in either the '+a' or '+b' directions provided tokens and links are available.

Dynamic routing, where the proper routing path is determined at every node, is enabled by setting the 'dynamic routing' bit in the data packet header 514 to 1. To improve performance on asymmetric tori, 'zone' routing can be used to force dynamic packets down certain dimensions before others. In one embodiment, the data packet 384 contains 2 zone identifier bits 520 and 521, which point to registers in the network DCR unit 355 containing the zone masks. These masks are only used when dynamic routing is enabled. The mask bits are programmed into the network DCR 355 registers by software. The zone identifier set by 'zone identifier' bits 520 and 521 are used to select an appropriate mask from the network DCR 355. In one embodiment, there are five sets of masks for each zone identifier. In one embodiment, there is one corresponding mask bit for each hint bit. In another embodiment, there is half the number of mask bits as there are hint bits, but the mask bits are logically expanded so there is a one-to-one correlation between the mask bits and the hint bits. For example, in a five-dimensional torus if the mask bits are set to 10100, where 1 represents the 'a' dimension, 0 represents the 'b' dimension, 1 represents the 'c' dimension, 0 represents the 'd' dimension, and 0 represents the 'e' dimension, the bits for each dimension are duplicated so that 11 represents the 'a' dimension, 00 represents the 'b' dimension, 11 represents the 'c' dimension, 00 represents the 'd' dimension, and 00 represents the 'e' dimension. The duplication of bits logically expands 10100 to 1100110000 so there are ten corresponding mask bits for each of the ten hint bits.

In one embodiment, the mask also breaks down the torus into 'zones'. A zone includes all the allowable directions in which the data packet may move. For example, in a five dimensional torus, if the mask reveals that the data packet is only allowed to move along in the '+a' and '+e' dimensions, then the zone includes only the '+a' and '+e' dimensions and excludes all the other dimensions.

For selecting a direction or a dimension, the packet's hint bits are AND-ed with the appropriate zone mask to restrict the set of directions that may be chosen. For a given set of zone masks, the first mask is used until the destination in the first dimension is reached. For example, in a 2N×N×N×N×2 torus, where N is an integer such as 16, the masks may be selected in a manner that routes the packets along the 'a' dimension first, then either the 'b' 'c' or 'd' dimensions, and then the 'e' dimension. For random traffic patterns this tends to have packets moving from more busy links onto less busy links. If all the mask bits are set to 1, there is no ordering of dynamic directions. Regardless of the zone bits, a dynamic packet may move to the 'bubble' VC to prevent deadlocks between nodes. In addition, a 'stay on bubble' bit 522 may be set; if a dynamic packet enters the bubble VC, this bit causes the packet to stay on the bubble VC until reaching its destination.

As an example, in a five-dimensional torus, there are two zone identifier bits and ten hint bits stored in a data packet. The zone identifier bits are used to select a mask from the network DCR 355. As an example, assume the zone identifier bits 520 and 521 are set to '00'. In one embodiment, there are up to five masks associated with the zone identifier bits set to '00'. A mask is selected by identifying an 'operative zone', i.e., the smallest zone for which both the hint bits and the zone mask are non-zero. The operative zone can be found using equation 1 where in this example m='00', the set of zone masks corresponding to zone identifier bits '00':

$$\text{zone } k = \min\{j: h \,\&\, ze\_m(j) != 0\} \tag{1}$$

Where j is a variable representing the zone masks for each of the dimensions in the torus, i.e., in a five-dimensional torus k=0 to 4, j varies between 0 and 4 h represents the hint bits and ze_m(j) represents the mask bits, and the '&' represents a bitwise 'AND' operation.

The following example illustrates how a network logic device 381 implements equation 1 is used to select an appropriate mask from the network DCR registers. As an example, assume the hint bits are set as 'h'=1000100000 corresponding to moves along the '−a' and the '−c' dimensions. Assume that three possible masks associated with the zone identifiers bits 520 and 521 are stored in the network DCR unit as follows: ze_m(0)=0011001111 (b, d or e moves allowed); ze_m(1)=1100000000 (a moves allowed); and ze_m(2)=0000110000 (c moves allowed).

Network logic device 381 further applies equation 1 to the hint bits and each individual zone, i.e., ze_m(0), ze_m(1), ze_m(2), reveals the operative zone is found when k=1 because h & ze_m(0)=0, but h& ze_m(1)!=0, i.e., when the hint bits and the mask are 'AND'ed together the result is the minimum value that does not equal zero. When j=0, h & ze_m(0)=0, i.e., 1000100000 & 0011001111=0. When j=1, h & ze_m(1)=1000100000 & 1100000000=1000000000. Thus in equation 1, the min j such that h & ze_m(j)!=0 is 1 and so k=1.

After all the moves along the links interconnecting nodes in the 'a' dimension are made, at the last node of the 'a' dimension, as described earlier the logic sets the hint bits for the 'a' dimension to '00' and the hint bits 'h'=0000100000, corresponding to moves along the 'c' dimension in the example described. The operative zone is found according to equation 1 when k=2 because 'h & ze_m(0)=0', and 'h & ze_m(1)=0', and 'h & ze_m(2)!=0'.

The network logic device 381 then applies the selected mask to the hint bits to determine which direction to forward the data packet. In one embodiment, the mask bits are 'AND'ed with the hint bits to determine the direction of the data packet. Using the example where the mask bits are 1, 0, 1, 0, 0, indicating that moves in the dimensions 'a' or 'c' are allowed. Assume the hint bits are set as follows: hint bit 501 is set to 1, hint bit 502 is set to 0, hint bit 503 is set to 0, hint bit 504 is set to 0, hint bit 505 is set to 1, hint bit 506 is set to 0, hint bit 507 is set to 0, hint bit 508 is set to 0, hint bit 509 is set to 0, and hint bit 510 is set to 0. The first hint bit 501, a 1 is 'AND'ed with the corresponding mask bit, also a 1 and the output is a 1. The second hint bit 502, a 0 is 'AND'ed with the corresponding mask bit, a 1 and the output is a 0. Application of the mask bits to the hint bits reveals that movement is enabled along '−a'. The remaining hint bits are 'AND'ed together with their corresponding mask bits to reveal that movement is enabled along the '−c' dimension. In this example, the data packet will move along either the '−a' dimension or the '−c' dimension towards its final destination. If the data packet first reaches a destination along the '−a' dimension, then the data packet will continue along the '−c' dimension towards its destination on the '−c' dimension. Likewise, if the data packet reaches a destination along the '−c' dimension then the data packet will continue along the '−a' dimension towards its destination on the '−a' dimension.

As a data packet 384 moves along towards its destination, the hint bits may change. A hint bit is set to 0 when there are no more moves left along a particular dimension. For example, if hint bit 501 is set to 1, indicating the data packet is allowed to move along the '−a' direction, then hint bit 501 is set to 0 once the data packet moves the maximum amount along the '−a' direction. During the process of routing, it is understood that the data packet may move from a sending node to one or more intermediate nodes before each arriving at the destination node. Each intermediate node that forwards the data packet towards the destination node also functions as a sending node.

In some embodiments, there are multiple longest dimensions and a node chooses between the multiple longest dimensions to selecting a routing direction for the data packet 384. For example, in a five dimensional torus, dimensions '+a' and '+e' may be equally long. Initially, the sending node chooses to between routing the data packet 384 in a direction along the '+a' dimension or the '+e' dimension. A redetermination of which direction the data packet 384 should travel is made at each intermediate node. At an intermediate node, if '+a' and '+e' are still the longest dimensions, then the intermediate node will decide whether to route the data packet 384 in direction of the '+a' or '+e' dimensions. The data packet 384 may continue in direction of the dimension initially chosen, or in direction of any of the other longest dimensions. Once the data packet 384 has exhausted travel along all of the longest dimensions, a network logic device at an intermediate node sends the data packet in direction of the next longest dimension.

The hint bits are adjusted at each compute node 200 as the data packet 384 moves towards its final destination. In one embodiment, the hint bit is only set to 0 at the next to last node along a particular dimension. For example, if there are 32 nodes along the '+a' direction, and the data packet 384 is travelling to its destination on the '+a' direction, then the hint bit for the '+a' direction is set to 0 at the 31st node. When the 32nd node is reached, the hint bit for the '+a' direction is already set to 0 and the data packet 384 is routed along another dimension as determined by the hint bits, or received at that node if all the hint bits are zero.

In an alternative embodiment, the hint bits need not be explicitly stored in the packet, but the logical equivalence to the hint bits, or "implied" hint bits can be calculated by the network logic on each node as the packet moves through the network. For example, suppose the packet header contains not the hint bits and destination, but rather the number of remaining hops to make in each dimension and whether the plus or minus direction should be used in each direction (a direction indicator). Then, when a packet reaches a node, the implied hint for a direction is if the number of remaining hops in that dimension is non-zero, and the direction indicator for that dimension is set. Each time the packet makes a move in a dimension, the remaining hop count is decremented is decremented by the network logic device 381. When the remaining hop count is zero, the packet has reached its destination in that dimension, at which point the implied hint bit is zero.

Figure 6:
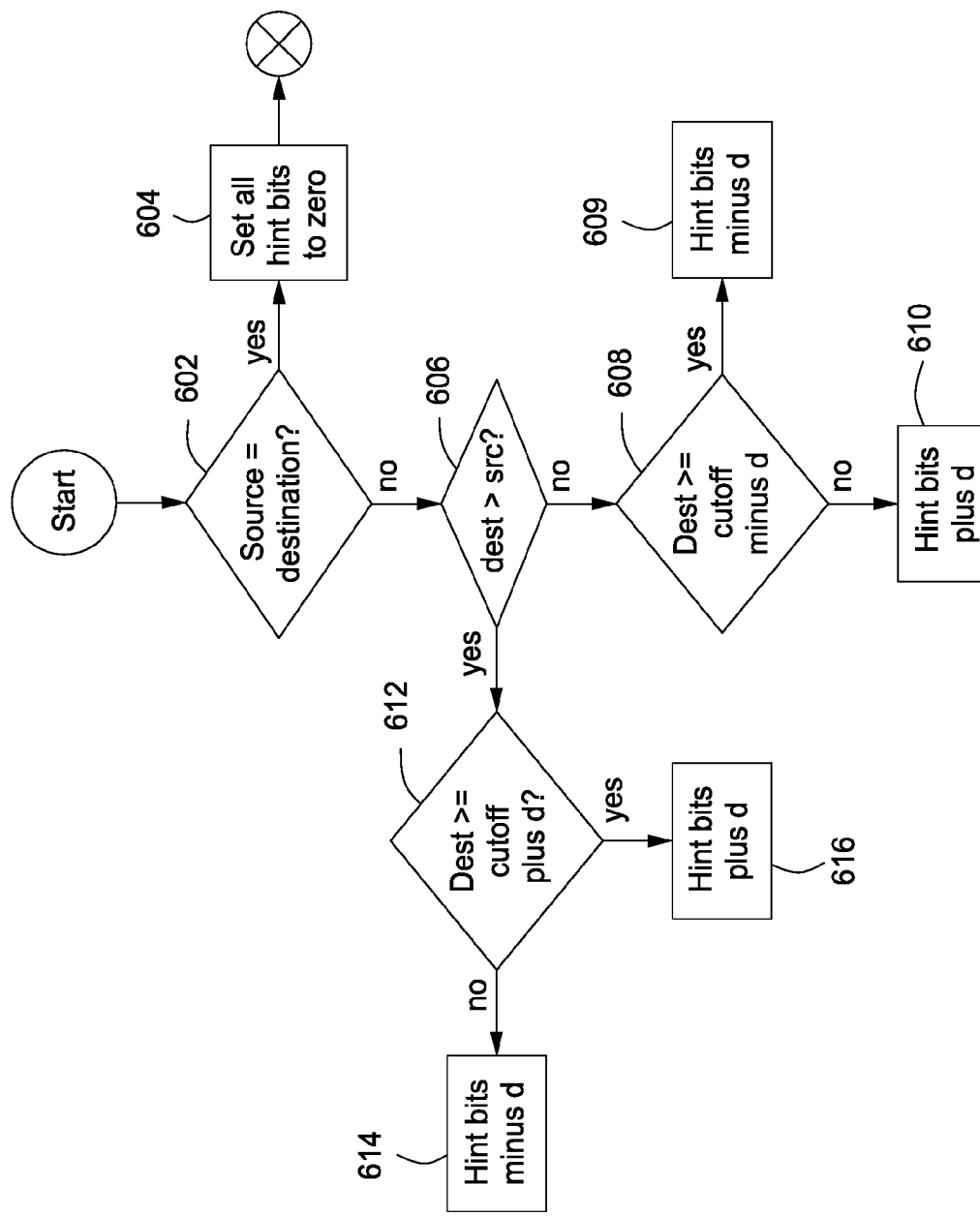
FIG. 6 is a flowchart of a method for calculating hint bits in accordance with one embodiment of the invention.

Referring now to FIG. 5, a method for calculating the hint bits is described. The method may be employed by the hardware bit calculator or by a computer readable medium (software running on a processor device at a node). The method is implemented when the data packet 384 is written to an Injection FIFO buffer 380 and the hint bits have not yet been set within the data packet, i.e., all the hint bits are zero. This occurs when a new data packet originating from a sending node is placed into the Injection FIFO buffer 380. A hint bit calculator in the network logic device 381 reads the network DCR registers 355, determines the shortest path to the receiving node and sets the hint bits accordingly. In one embodiment, the hint bit calculator calculates the shortest distance to the receiving node in accordance with the method described in the following pseudocode, which is also shown in further detail in FIG. 6:

```
If src[d] == dest[d] hint bits in dimension d are 0
if (dest[d] > src[d] )
{
if ( dest[d] <= cutoff_plus[d]) hint bits in dimension d is set to plus
else hint bits in dimension d = minus
}
if (dest[d] < src[d] )
{
if ( dest[d] >= cutoff_minus[d]) hint bits in dimension d is set to minus
else hint bits in dimension d = plus}
```

Where d is a selected dimension, e.g., '+/−x', '+/−y', '+/−z' or '+/−a', '+/−b', '+/−c', '+/−d', '+/−e'; and cutoff_plus[d] and cutoff_minus[d] are software controlled programmable cutoff registers that store values that represent the endpoints of the selected dimension. The hint bits are recalculated and rewritten to the data packet 384 by the network logic device 381 as the data packet 384 moves towards its destination. Once the data packet 384 reaches the receiving node, i.e., the final destination address, all the hint bits are set to 0, indicating that the data packet 384 should not be forwarded.

The method starts at block 602. At block 602, if a node along the source dimension is equal to a node along the dimension, then the data packet has already reached its destination on that particular dimension and the data packet does not need to be forwarded any further along that one dimension. If this situation is true, then at block 604 all of the hint bits for that dimension are set to zero by the hint bit calculator and the method ends. If the node along the source dimension is not equal to the node along the destination dimension, then the method proceeds to step 606. At step 606, if the node along the destination dimension is greater than the node along the source dimension, e.g., the destination node is in a positive direction from the source node, then method moves to block 612. If the node along the destination dimension is not greater than the source node, e.g., the destination node is in a negative direction from the source node, then method proceeds to block 608.

At block 608, a determination is made as to whether the destination dimension is greater than or equal to a value stored in the cutoff minus register. The plus and minus cutoff registers are programmed in such a way that a packet will take the smallest number of hops in each dimension If the destination dimension is greater than or equal to the value stored in the cutoff_minus register, then the method proceeds to block 609 and the hint bits are set so that the data packet 384 is routed in a negative direction for that particular dimension. If the destination dimension is not greater than or equal to the value stored in the cutoff_plus register, then the method proceeds to block 610 and the hint bits are set so the data packet 384 is routed in a positive dimension for that particular dimension.

At block 612, a determination is made as to whether the destination dimension is less than or equal to a value stored in the cutoff_plus register. If the destination dimension is less than or equal to the value stored in the cutoff_plus register, then the method proceeds to block 616 and the hint bits are set so that the data packet is routed in a positive direction for that particular dimension. If the destination dimension is not less than or equal to the value stored in the cutoff_plus register, then the method proceeds to block 614 and the hint are set so that the data packet 384 is routed in a negative direction for that particular dimension.

The above method is repeated for each dimension to set the hint bits for that particular dimension, i.e., in a five-dimensional torus the method is implemented once for each of the 'a', 'b', 'c', 'd', and 'e' dimensions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit,' 'module' or 'system.' Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction operation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction operation system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 1 through 6. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be operated substantially concurrently, or the blocks may sometimes be operated in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

The invention claimed is:

1. A system for routing a data packet in a network comprising:
   a network logic device at a sending node for determining a path between the sending node and a receiving node;
   a control register for storing one or more masks, wherein at the sending node the network logic device uses one or more selection bits to select a mask from the control register and the network logic device applies the selected mask to one or more hint bits to restrict routing of the data packet to one or more routing directions for the data packet within the network and selects one of the restricted routing directions from the one or more routing directions and sends the data packet along a link in the selected routing direction toward the receiving node.

2. The system of claim 1, wherein the network logic device performs a logic operation on the one or more hint bits using the mask to determine the routing directions of the data packet within the network.

3. The system of claim 1, wherein the network comprises one or more longest dimensions and the network logic device first sends the data packet on the link in direction of one of the longest dimensions, and wherein at an intermediate node along the path, a network logic device predetermines whether to send the data packet along a link in direction of the initially chosen longest dimension or along another link in direction of one of the other longest dimensions.

4. The system of claim 3, wherein the data packet reaches a destination along one of the longest dimensions, and a network logic device at an intermediate node sends the data packet along another link in direction of a next longest dimension.

5. The system of claim 3, wherein at the intermediate node the network logic device selects a further mask from a control register and the network logic device applies the further mask to the one or more hint bits to restrict the data packet to one or more routing directions for the data packet within the network and selects one of the restricted routing directions from the one or more routing directions and sends the data packet along a link in the selected routing direction toward the receiving node.

6. The system of claim 1, wherein the network logic device routes the data packet on a link in direction of an escape link and an escape virtual channel when movement in the one or more routing directions for the data packet within the network is unavailable.

7. The system of claim 1, wherein a calculator calculates a shortest distance between a sending node and a receiving node and sets the one or more hint bits based on the shortest distance.

8. The system of claim 1, wherein the mask includes less mask bits than there are hint bits, and the network logic device expands the mask bits to equal the number of hint bits in the data packet.

9. The system of claim 1, wherein the network is a multi-dimensional torus network comprising a plurality of nodes, wherein the selected routing direction between the sending node and the receiving node is determined on a node by node basis.

10. A computer implemented method for routing a data packet in a network comprising:
    determining a path between a sending node and a receiving node;
    setting hint bits and one or more selection bits within the data packet;
    using the one or more selection bits to select a mask; and
    applying the mask to the hint bits to restrict one or more routing directions for the data packet within the network;
    selecting one of the one or more restricted routing directions for the data packet; and
    initiating routing of said packet along a link in the routing direction, wherein a processor performs one or more steps of determining, setting, using, applying, selecting and initiating.

11. The method of claim 10, wherein the step of applying further comprises performing an AND operation on the hint bits using the mask to determine the direction of the data packet within the network.

12. The method of claim 10, further comprising first routing the data packet on a link in direction of a longest dimension, and when the data packet reaches a destination along the longest dimension, successively routing the data packet along another link in direction of a next longest dimension.

13. The method of claim 10, further comprising routing the data packet in direction of an escape link and an escape virtual channel when movement in the one or more routing directions for the data packet within the network is unavailable.

14. The method of claim 10, further comprising utilizing a calculator to calculate a shortest distance between a sending node and a receiving node and setting the hint bits based on the shortest distance.

15. The method of claim 10, wherein the mask includes less mask bits than there are hint bits, further comprising logically expanding the mask bits to equal the number of hint bits in the data packet.

16. A computer program product for routing a data packet in a network comprising:
    a storage device readable by a processor and storing instructions for operation by the processor for performing a method comprising:

determining a path between a sending node and a receiving node;

setting hint bits and one or more selection bits within the data packet;

using the one or more selection bits to select a mask; and applying the mask to the hint bits to determine a routing direction on the path for the data packet within the network and initiating routing of said packet along a link in the routing direction toward the receiving node.

17. The computer program product of claim 16, wherein the step of applying further comprises performing an AND operation on the hint bits using the mask to determine the direction of the data packet within the network.

18. The computer program product of claim 16, further comprising first routing the data packet along a link in direction of a longest dimension, and when the data packet reaches a destination along the longest dimension, successively routing the data packet along another link in direction of a next longest dimension.

* * * * *